United States Patent
Hainzlmaier et al.

(10) Patent No.: US 9,709,418 B2
(45) Date of Patent: Jul. 18, 2017

(54) METHOD FOR OPERATING A NAVIGATION SYSTEM, NAVIGATION SYSTEM AND MOTOR VEHICLE

(71) Applicant: AUDI AG, Ingolstadt (DE)

(72) Inventors: Andre Hainzlmaier, Geisenfeld (DE); Patrick Heinemann, Kosching (DE); Daniel Profendiner, Ingolstadt (DE); Martin Enning, Wettstetten (DE); Viet Hoang Pham, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/905,186

(22) PCT Filed: Jun. 21, 2014

(86) PCT No.: PCT/EP2014/001691
§ 371 (c)(1),
(2) Date: Jan. 14, 2016

(87) PCT Pub. No.: WO2015/007362
PCT Pub. Date: Jan. 22, 2015

(65) Prior Publication Data
US 2016/0178389 A1    Jun. 23, 2016

(30) Foreign Application Priority Data
Jul. 15, 2013    (DE) .................. 10 2013 011 827

(51) Int. Cl.
*G01C 21/36*    (2006.01)
(52) U.S. Cl.
CPC ..... *G01C 21/3644* (2013.01); *G01C 21/3602* (2013.01)
(58) Field of Classification Search
CPC .................. G01C 21/3644; G01C 21/3602
See application file for complete search history.

(56) References Cited

U.S. PATENT DOCUMENTS

| 6,480,786 B2 | 11/2002 | Watanabe et al. |
| 8,866,673 B2 * | 10/2014 | Mendelson .......... G01C 21/206 342/386 |

(Continued)

FOREIGN PATENT DOCUMENTS

| DE | 10041714 | 5/2002 |
| DE | 102006010478 | 9/2007 |

(Continued)

OTHER PUBLICATIONS

International Preliminary Report on Patentability (Chapter II) from International Application No. PCT/EP2014/001691, dated Oct. 15, 2015.

(Continued)

*Primary Examiner* — Richard Camby
(74) *Attorney, Agent, or Firm* — Alston & Bird LLP (57) ABSTRACT

A method for operating a navigation system, in particular in a motor vehicle, comprising the following steps:
  determining an upcoming waypoint of a route, which is planned by the navigation system, with respect to which an item of navigation information is to be output to a user,
  ascertaining surroundings data relating to the surroundings of the waypoint,
  ascertaining at least one reference object, which is located in the surroundings of the waypoint, from the surroundings data,
  assigning a verbal designation to the reference object,
  preparing the navigation information comprising the designation, and
  acoustically outputting the navigation information.

6 Claims, 5 Drawing Sheets

(56) References Cited

U.S. PATENT DOCUMENTS

| | | |
|---|---|---|
| 2002/0120397 A1 | 8/2002 | Kepler |
| 2007/0233380 A1 | 10/2007 | Tanaka |
| 2009/0187333 A1 | 7/2009 | Mueller |
| 2009/0222203 A1 | 9/2009 | Mueller |
| 2009/0240432 A1 | 9/2009 | Osanai |
| 2010/0250116 A1 | 9/2010 | Yamaguchi et al. |
| 2010/0250126 A1 | 9/2010 | Epshtein et al. |
| 2013/0170706 A1 | 7/2013 | Mori et al. |
| 2015/0057920 A1 | 2/2015 | Von Zitzewitz |

FOREIGN PATENT DOCUMENTS

| | | |
|---|---|---|
| DE | 102006010481 | 9/2007 |
| DE | 10 2007 014 674 | 10/2007 |
| DE | 102008041295 | 2/2010 |
| DE | 11 2008 003 341 | 2/2011 |
| DE | 102011084993 | 4/2013 |
| EP | 1 378 724 | 1/2004 |
| EP | 1906339 | 4/2008 |
| EP | 2 290 324 | 3/2011 |
| EP | 2 458 337 | 5/2012 |

OTHER PUBLICATIONS

International Search Report and Written Opinion for corresponding International Application No. PCT/EP2014/001691, dated Sep. 29, 2014.

\* cited by examiner

METHOD FOR OPERATING A NAVIGATION SYSTEM, NAVIGATION SYSTEM AND MOTOR VEHICLE

CROSS REFERENCE TO RELATED APPLICATIONS

This application is a national stage 371 application of International Application No. PCT/EP2014/001691 filed Jun. 21, 2014, which claims priority to and the benefit of German Application No. 102013011827.1, filed Jul. 15, 2013, the entire contents of which are hereby incorporated by reference.

The invention relates to a method for operating a navigation system, in particular in a motor vehicle.

Navigation systems offer users the capability of finding a destination in an easy and uncomplicated manner. Therefore, navigation systems are gladly used in particular in motor vehicles and in particular by persons, who frequently travel unknown routes. In a navigation system, the position of a user is typically ascertained, typically via the global positioning system (GPS), and map material stored in the device and route planning software installed on the device are used to guide a user to the destination.

Such guidance takes place in that the navigation system gives a user suggestions for navigation. In a motor vehicle, these can be instructions for driving maneuvers to be carried out, for example. In addition to the maneuver itself, i.e., turn right, for example, it has to be communicated to the user when this maneuver is to be carried out. In particular in complex traffic situations, this should take place early, so that the user can prepare sufficiently for a driving maneuver to be carried out. To give such early instructions, it is typical to additionally provide a navigation instruction with a distance specification or to use street names as orientation points. Therefore, items of navigation information, for example, "turn left in 100 m", "turn right into the next street", or "drive onto Richard Wagner street" can therefore be given.

Giving navigation instructions with usage of distance specifications or street names is possible particularly simply, since if a roadmap is used in the navigation system, items of information about street names and distances are present in any case. However, it is disadvantageous that distances frequently cannot be correctly estimated and street names can be recognized clearly and unambiguously in the street scene only in rare cases by users of navigation systems. It is easily possible in this case that a user of a navigation system cannot follow the navigation instructions. The general usage comfort is also reduced in that a user has to look out for road signs or the like. It can also be necessary to significantly slow the travel, to recognize the street onto which a turn is to be performed.

The invention is therefore based on the object of specifying a method for operating a navigation system, which enables an improved output of navigation instructions in relation thereto.

The object is achieved according to the invention by a method of the type mentioned at the outset, which comprises the following steps:
  determining an upcoming waypoint of a route planned by the navigation system, with respect to which an item of navigation information is to be output to a user,
  ascertaining surroundings data relating to the surroundings of the waypoint,
  ascertaining at least one reference object, which is located in the surroundings of the waypoint, from the surroundings data,
  assigning a verbal designation to the reference object,
  preparing the navigation information comprising the designation, and
  acoustically outputting the navigation information.

The invention is based on the concept that it is much simpler for a variety of users of navigation systems to orient themselves on objects of daily life, for example, houses, parked vehicles, trees, or the like, than to street names. Thus, in daily life, route descriptions are frequently given, for example, "turn right at the church" or the like. In particular when using a navigation system in a motor vehicle, object-based navigation has the advantage that markings for waypoints can be used, which are immediately visible to the user of the navigation system. It is thus much simpler to recognize a specific building, a motor vehicle of a specific color, or the like than a street having a specific name, in particular because street signs are frequently concealed by other objects or are at least difficult to recognize from a distance.

The steps of the method can all be carried out by a navigation system. Such a navigation system can also be used by pedestrians, bicycle riders, or the like. Thus, for example, a variety of modern smart phones or other mobile electronic devices control fundamental functions of a navigation system. The method according to the invention for operating a navigation system can also be used on such devices. The use of the method according to the invention is particularly advantageous, however, in motor vehicles, since they typically move at a higher speed than pedestrians, bicycle riders, or the like. Navigation on the basis of reference objects additionally offers significantly increased driving convenience. Moreover, motor vehicles frequently have a variety of additional sensors, in particular imaging sensors such as cameras or the like, using which particularly good recognition of noteworthy objects and therefore particularly good navigation using the method according to the invention is possible.

In particular in motor vehicles, it is possible that some steps of the method are carried out by systems provided in the motor vehicle other than the navigation system. It is thus possible, for example, that image processing means are already associated with the camera, which can completely or partially undertake object recognition. It is also possible that specific objects have already been recognized by driver assistance systems. Communication devices, position determination systems, sensors, loudspeakers, or the like, which are also used for further tasks in the motor vehicle, can also be used when carrying out the method.

When carrying out the method according to the invention, an item of acoustic navigation information is to be provided to the driver, using which he is typically notified that a specific driving maneuver is to be carried out at an upcoming waypoint of a planned route. Methods for planning a route in navigation systems are well known in the prior art and are not to be described further here. Such a planned route typically comprises a variety of points, at which specific driving maneuvers are to be carried out by the driver, for example, a lane change, turning off into streets, or the like. As explained at the outset, such items of information are typically already acoustically output a specific time before reaching the point at which the driving maneuver is to be executed.

Using the method according to the invention, it is possible to specify, instead of a street name or a distance, a specific object, which marks the point at which the driving maneuver is to be carried out. For this purpose, firstly an upcoming waypoint is selected, at which an item of navigation information is to be output. This is typically the closest waypoint, at which a driving maneuver by the driver is necessary. In some cases, for example, if multiple driving maneuvers are to take place within a short time on the planned route, it is possible to also carry out the method according to the invention for a waypoint other than a directly upcoming waypoint.

In the following step of the method, surroundings data relating to the surroundings of the waypoint are collected. It is possible in this case that the motor vehicle uses a single data source, however, multiple data sources can also be used and in particular combined. Surroundings data can be determined in particular by local databases, databases which can be accessed via a wireless communication interface, or sensor data. For example, a front camera of the motor vehicle can record an image of the vehicle surroundings. By using known methods of image processing, not only the spatial angle at which an object is located, but rather also the distance of the object can usually already be determined from a single camera image. It is therefore possible to identify objects which are located in the vicinity of an upcoming waypoint. Alternatively or additionally, however, it is also possible to use databases having location-specific items of information, for example, lists of tourist attractions, address registers, aerial image databases, or the like.

Individual reference objects can subsequently be ascertained from the ambient data. Such reference objects can be recognized, for example, by way of image recognition in images, however, it is also possible that the object is described directly in the ascertained surroundings data. In particular, for example, positions of buildings or the like can be acquired in databases. Typically, only the designation of a single reference object is to be output. Therefore, for example, only one reference object can be ascertained. However, it is advantageous to ascertain multiple potential reference objects and to select a particularly well suitable reference object therefrom. To be particularly well suitable as a reference object, a reference object should fulfill multiple requirements. Thus, a reference object should not change its position at least for the time which a user requires for reaching the waypoint. Therefore, in particular nonmoving objects such as houses, billboards, or the like are particularly well suitable as reference objects. In addition, a reference object should be easily recognizable. It is therefore advantageous in this step to select particularly large or particularly noticeable objects. In addition, the reference object should also be unambiguously identifiable. For example, if many red parked automobiles are recognized, a red parked automobile can thus be discarded as a reference object, if other, better suitable reference objects are recognized.

The reference object is to be used in the method according to the invention for marking a waypoint. To achieve this purpose, however, it has to be communicated to the user what this reference object is. The communication of the navigation information and therefore of the reference object takes place acoustically in the method according to the invention. It is therefore necessary to play back the reference object acoustically, because of which a verbal designation is assigned to the reference object in the method according to the invention.

Finding such a designation can be particularly simple if the original surroundings data, from which the object was ascertained, originate from a database having location-specific items of information. A designation for the reference object is frequently already stored in this database and is therefore available in the method according to the invention. Typically, only specific objects are recognized and identified also when recognizing objects from sensor data, in particular from camera images. It is in particular possible in this case that the navigation system uses a database, which comprises verbal designations for such known objects.

The verbal designation for a reference object can firstly be ascertained in text form and can subsequently be prepared for acoustic output, for example, by a text-to-speech system or the like, however, it is also possible that databases are used which comprise directly spoken verbal designations for the reference objects.

In addition to an object type, i.e., for example, the information that the reference object is an automobile, a house, a tree, or the like, further properties of the object can also be specified. The verbal designation can therefore be composed in particular of at least one adjective and at least one noun. In this case, the adjective can be a color designation or a size specification, for example. Further adjectives can also be incorporated, for example, "parked" or the like, so that verbal designations can be formed such as "parked red automobile", "large house", or the like, for example.

In particular in the case of buildings, but also in the case of trucks, billboards, or the like, it is also possible that the designation comprises a company name, a business designation, the type of the advertised object, or the like. It is also possible in this case to only reproduce parts of these designations. Thus, only the type of the business, for example, "butcher" or only a name of the business, for example, the name of the store owner or the like, can be output. The usage of designations for shops, restaurants, or the like is particularly advantageous, since frequently noticeable signs are attached to such buildings. The corresponding items of information can be recognized, for example, directly from images of the signs, however, it is also possible to ascertain such items of information from telephone books, business directories, or the like. Logos can also be recognized and compared to databases, for example, to arrive at a verbal designation.

The verbal designation of a reference object is subsequently used to prepare an item of navigation information, which is to be output to the user. Such an item of navigation information typically also comprises, in addition to the designation of the reference object, a navigation instruction, for example, in motor vehicles, a driving instruction, and under certain circumstances also relative specifications, such as "before", "after", "at", or the like. Therefore, in the last step of the method, items of navigation information can be output, which, for the clear and simple orientation of the user, designate an object, which marks a location at which, for example, a specific driving maneuver is to be carried out. Using the method according to the invention, items of navigation information can thus be output particularly intuitively, such as "ahead at the blue delivery van on the right" or "up ahead at the fast food restaurant on the left".

The navigation system can advantageously determine the surroundings data at least partially on the basis of sensor data of sensors, which are arranged on the motor vehicle in particular. The sensor data can be analyzed by the navigation system itself, however, it is also possible that the navigation system uses data which are already preprocessed. For example, a driver assistance system of the motor vehicle can already comprise items of information about parked vehicles on the basis of sensor data. In this case, objects are already identified and items of position information for these objects are also already present. These items of information can then be supplemented, for example, by an item of color information, which was obtained from a camera image. However, sensor data can also be used to refine data, which originate from a database having location-specific items of information, for example, and/or to recognize whether a line of sight to specific reference objects is blocked, whereby it is advantageous to use other reference objects to form the navigation information.

In particular, the sensor data can be image data of a camera which acquires the surroundings. If a navigation system is used in the motor vehicle, in particular a front camera of the motor vehicle can be used in this case. Image data can be used in particular to determine a possible field of vision of a user and therefore to recognize which reference objects can be recognized particularly well or particularly poorly in the surroundings of the waypoint. Auxiliary items of information about objects which are ascertained with the aid of other methods, such as the color of an object or the like, can also be easily ascertained using items of image information.

It is already possible to estimate a distance to an object from a two-dimensional image using a variety of image processing algorithms, whereby solely by way of image processing of the image data of a camera, reference objects in the surroundings of the waypoint can be determined. Specific advertising motifs or logos can also be recognized in the scope of the image processing and therefore, for example, known product designations can be used as part of a verbal designation for a reference object. The acquired image data can also be combined with data from databases and can be supplemented thereby or compared thereto.

A variety of image recognition algorithms are known in the prior art, which enable a recognition of an object type. The recognition of scale-invariant features is mentioned here solely as an example. The field of image recognition is in continuous development, however. Therefore, the corresponding algorithms will not be described in detail here.

Alternatively or additionally, it is possible that the navigation system determines the surroundings data at least partially by determining a position of the waypoint and analyzing at least one database having location-specific items of information. Such a database can be a digital map in the simplest case, as is provided in any case in most navigation systems. Such digital maps can also comprise, for example, items of information about gas stations, restaurants, tourist attractions, or the like. In some traffic situations, a reference object can already be determined using these items of information and therefore an intuitively comprehensible item of navigation information can be output. For example, navigation instructions such as "after the gas station on the left" or the like are possible with the aid of digital maps. It is also possible to use digital maps having additional details. In particular, databases having aerial pictures, in which features can be recognized, or the like can also be used. Address listings, in particular business directories or the like, are also usable.

In this case, it is possible that the database is present locally, i.e., for example, in a navigation system itself or in a storage system located outside the navigation system, for example, it is stored in a motor vehicle. In particular in motor vehicles, additional data memories such as drives can be provided for optical media or the like. However, it is also possible that the database is external and the access to the external database takes place by way of wireless communication. Such an external database can be a database which directly provides navigation aids, however, aerial images, address lists, maps, image services, and the like can also be used. It is possible in particular in this case that the database is an Internet database.

The wireless communication can take place in particular via a Car-2-X or a Car-2-Car navigation. However, for example, typical mobile wireless standards can also be used to communicate with Internet databases, for example.

It is advantageous if the reference object is a nonmoving object for a minimum period of time. Reference objects are to be used as fixed points in the method according to the invention, at which a user can orient himself rapidly and easily. If the reference object moved between the point in time at which the navigation information is output and the point in time at which a user reaches the waypoint, this could have the result that the user relates the navigation information to the incorrect location and therefore turns off into an incorrect street, for example.

It is frequently possible to recognize reference objects, in the case of which it can be presumed with a high level of certainty that no movement of the reference object takes place at least for the period of time considered here. These can be, for example, houses, trees, billboards, or similar permanently installed objects. However, it is also frequently desirable to use parked motor vehicles or the like as reference objects. Various criteria can be applied in this case, to be able to predict with a high level of probability whether a movement of such an object can be expected or not. For example, it can be established by sensors whether the engine of a motor vehicle is running or not running, it can be recognized from the position of a motor vehicle whether it is in a parking space or is located on a street or the like. It is also possible here to conclude from a longer observed lack of movement that no future movement will take place with a high level of probability. For example, it can be presumed, in the case of objects which do not move for a specific minimum time, for example, 30 seconds, that there is a lower probability they will move. Of course, boundary conditions can also be taken into consideration in this case, for example, whether a motor vehicle is standing at a traffic light or the like.

The reference object can be a building or a plant or a stationary panel. The panel can also be an information sign, in particular a traffic sign. Advertisements, i.e., hoardings, advertising columns, or the like can also be recognized. Alternatively or additionally, a recognition of signal devices, such as traffic signals, warning lights, or the like is also possible.

As mentioned at the outset, it is advantageous when preparing the navigation information to only use the designation of a single reference object. In the method according to the invention, however, it is entirely possible that a variety of reference objects are recognized in the surroundings of the waypoint. It is therefore advantageous if, when ascertaining multiple reference objects, an item of priority information is ascertained for the reference objects and a reference object, the designation of which is output, is selected in dependence on the priority information.

The priority information can be in particular a single numeric value, which specifies how well suitable a specific object is as a reference object. A variety of criteria can be used for the suitability of a reference object. For example, it can be checked on the basis of camera data how well or how early before reaching the waypoint a reference object is visible to the driver. In addition, it can be checked how unambiguously a reference object can be identified. Thus, for example, on an avenue, a tree should not be used as a reference object, since many similar reference objects are in the field of vision of the driver in this case and the navigation information will therefore be unclear.

The priority information can furthermore use the prominence of a reference point. It can thus typically be presumed that a user knows well-known tourist attractions or particularly well-known logos or the like and therefore can easily orient himself thereon. The priority information can also take into consideration whether a reference object is completely immovable and has already been located for years at a location, for example. Such a reference object can be advantageous, since a user of the navigation system is already familiar with the fact that this reference object is located at a specific point.

In addition, the invention relates to a navigation system for guiding a user along a route determined by the navigation system, wherein the navigation system is designed to carry out one of the above-described methods.

Moreover, the invention relates to a motor vehicle, which comprises the above-described navigation system.

Further advantages and details of the invention result from the following exemplary embodiments and on the basis of the associated drawings. In the figures.

Figure 1:
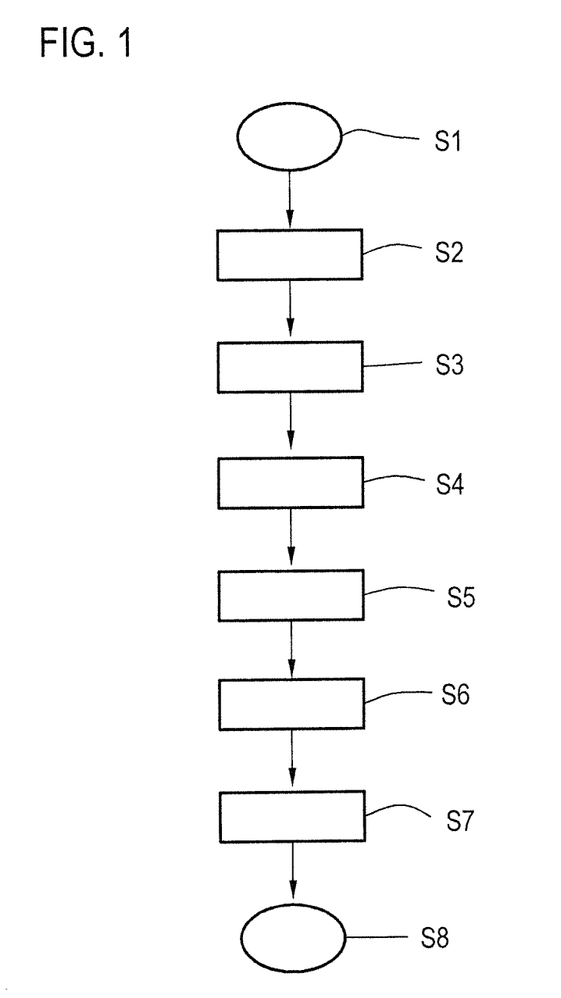
FIG. 1 shows a flow chart of an exemplary embodiment of the method according to the invention.

FIG. 1 shows a flow chart of a method for operating a navigation system. The method begins in step S1. A variety of preparatory steps are carried out in step S1, which are used to determine a route. Such a route can be determined, for example, in that a user inputs a destination via a user interface of the navigation system and the navigation system recognizes the ego position of the user from location data of a location determination device, for example, a GPS sensor. With the aid of a digital map, which comprises the courses of streets in particular, the navigation system can then calculate one or more routes from the ego position of the user to the destination. Such a route typically comprises a variety of waypoints, wherein an item of navigation information is to be output to a user for at least a subset of these waypoints. Such a waypoint can be, for example, a junction or an intersection, at which the motor vehicle, the route of which is planned by the navigation system, should turn off. It is to be presumed hereafter that firstly an item of navigation information is to be output for the waypoint which is nearest with respect to time. The explained method can also be used in exactly the same manner, however, for outputting an item of navigation information for a waypoint which is farther away with respect to time.

In step S2, the upcoming waypoint is determined, at which an item of navigation information is to be output to a user. This is the waypoint which is nearest with respect to time in the case considered here. A navigation system typically continuously acquires the ego position of a user, for example, by analyzing items of GPS information. Therefore, the absolute position of the waypoint, the street names in the region of the waypoint, and the relative position of the waypoint in relation to the user are therefore typically known for the waypoint. Using these items of information, an item of navigation information could be generated directly having instructions such as "turn right in 100 m" or "turn onto Richard Wagner Street".

In the further method steps, auxiliary items of information are ascertained, which enable supplementary or alternative designations for reference objects to be acoustically output, so that, for example, "left at the billboard" can be output as navigation information.

To enable this, firstly surroundings data relating to the surroundings of the waypoint are ascertained in step S3. The ascertainment of surroundings data is possible in particular by using sensors and using databases. If sensors are used, sensors of the navigation system itself or sensors of a device which comprises the navigation system, in particular of a motor vehicle, can be used to obtain surroundings data. In particular in the case of a visual contact between the ego position of the motor vehicle and the waypoint, the surroundings of the waypoint are acquired visually and/or by additional sensors and pattern recognition, in particular image recognition, can subsequently be carried out to recognize reference objects in the sensor data.

Additionally or alternatively, databases having location-specific items of information can also be used in step S3. Thus, navigation systems typically comprise digital maps, which already comprise individual reference objects having associated positions, for example, gas stations, tourist attractions, restaurants, and the like. These items of information can be used to generate items of navigation information such as "right at the church", for example. It is also possible that the navigation system or further devices which are directly connected to the navigation system comprise further databases. In particular, however, it is also possible to access databases via a wireless communication connection. Thus, in particular Internet databases can be used to obtain further location-specific items of information.

These items of information can be obtained in text form. Thus, for example, address databases or the like can be used. However, it is also possible to gather items of information from these databases, which subsequently have to be processed further, for example, aerial images. The database used can provide items of information specifically for navigation purposes, however, other databases can advantageously also be used.

In step S4, at least one reference object, which is located in the surroundings of the waypoint, is determined from the surroundings data obtained in step S3.

It is possible that a variety of reference objects are recognized in the surroundings of the waypoint. It is frequently advantageous to only output the designation of a single object when outputting the navigation information. Therefore, the reference objects can in particular also be provided with a priority, which designates how well suitable the individual objects are for navigation purposes.

Figure 2:
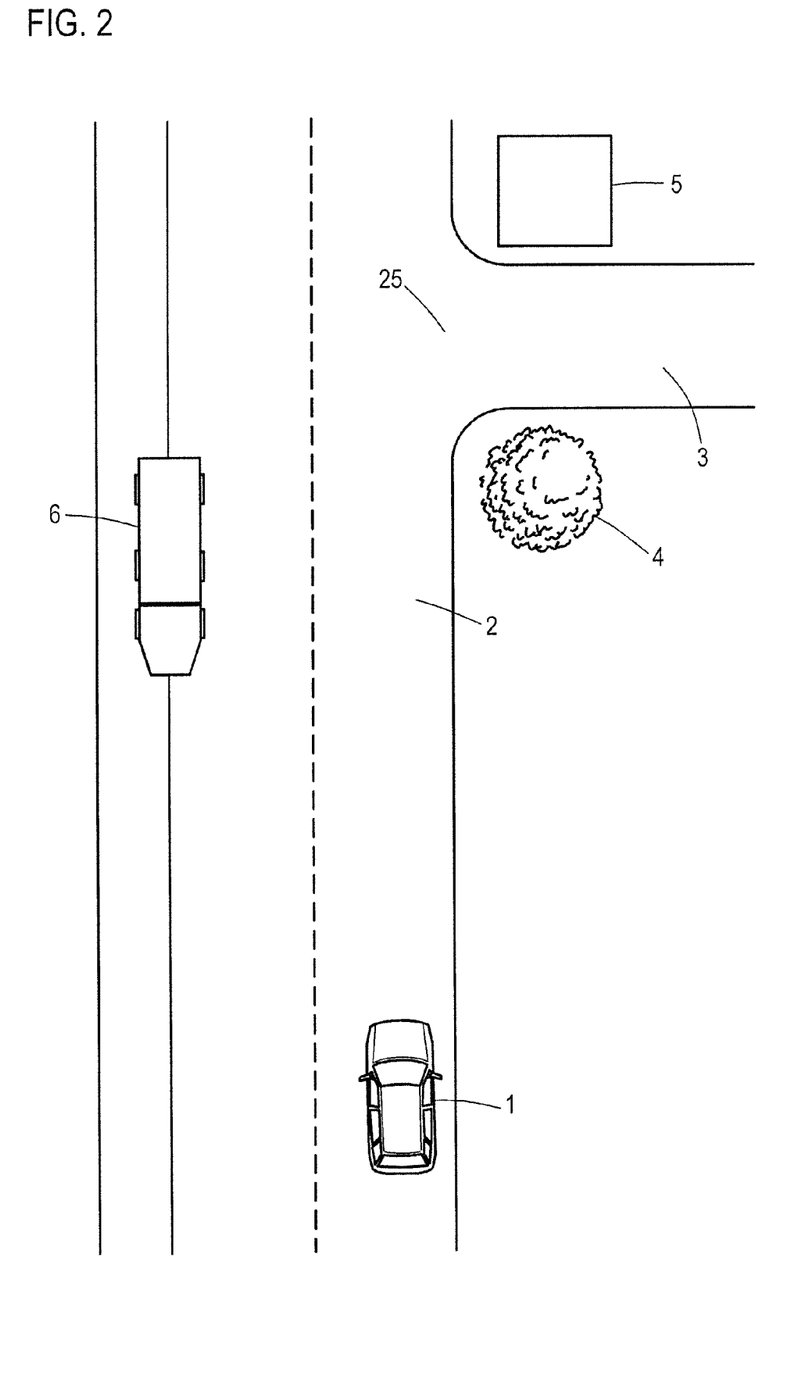
FIG. 2 shows a traffic situation in which the method according to the invention can be used.
Figure 3:
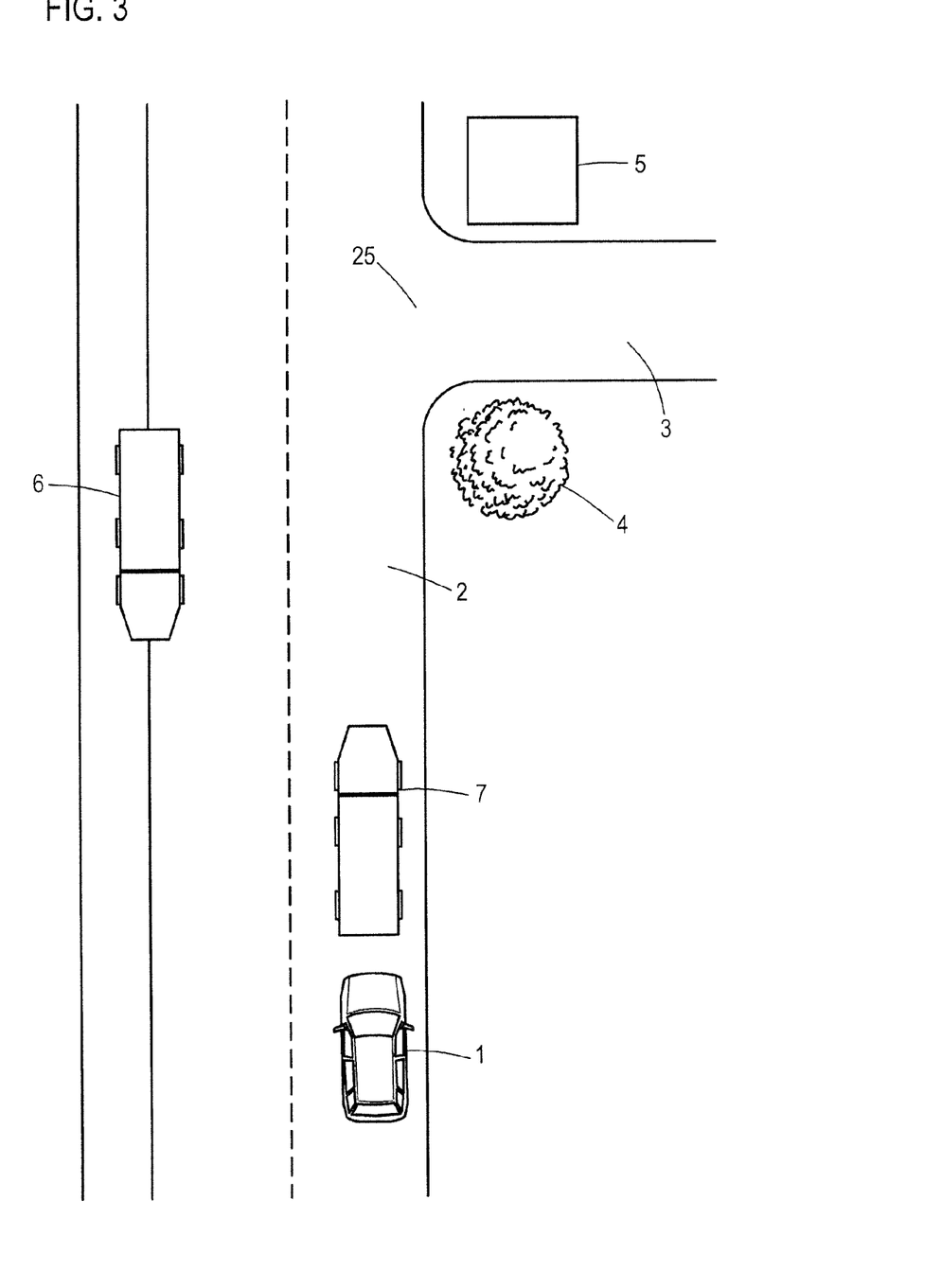
FIG. 3 shows the traffic situation from FIG. 2 with an additional truck.

The priority can be dependent, for example, on whether an object is reliably nonmoving, for example, a house, or how well an object can be recognized from the ego position of the user. The effects of such an item of priority information will be explained in the further text hereafter with reference to a specific example, which is shown in FIG. 2 and FIG. 3.

Items of information about the reference object can already be provided directly in a form usable in the method, for example, as a result of a database query, however, it is also possible that such items of information are first obtained by further image processing or the like. In particular if the method is used in motor vehicles, items of information of other motor vehicle systems can also be used. Items of information about further vehicles, in particular also parked vehicles, or other fixed boundary objects, which can be used in the method as reference objects, can thus already be obtained by driver assistance systems, for example.

The result of step S4 is a single reference object or a list of reference objects, which are located at the waypoint or in the vicinity of the waypoint, wherein further items of information about the reference object or objects were advantageously ascertained. A verbal designation is assigned to the reference object in step S5. It is possible, in particular if databases are used, that a verbal designation is already present for the reference object. If objects are recognized in image data or other sensor data, an object type is typically also recognized. This object type can be assigned a verbal designation, for example, via a dictionary specified in the navigation system. Database queries can also be used in the step of the assignment of a verbal designation. For example, logos or the like can be recognized, and a matching designation can be ascertained via a database query. A verbal designation typically comprises an object type. It can be advantageous to thus keep the object type relatively generic, i.e., for example, to thus designate motor vehicles only generally as automobiles, trucks, or motorcycles and not to append a more precise type specification, since a variety of users cannot easily differentiate motor vehicle types. This applies similarly for plants or buildings. At the same time, however, further items of information, which are very easy to recognize for a typical user, for example, the color of an object or the like, can be used as part of the verbal designation. Further adjectives which designate the properties of reference objects can also be used. The verbal designation can thus comprise items of size information, items of color information, or the like.

It is possible that the verbal designation ascertained in step S5 is firstly ascertained in text form. In this case, an output via a text-to-speech system can subsequently take place, for example. However, it is also possible to ascertain the verbal designation directly in a form which enables a direct acoustic playback. For example, a PCM-coded waveform can be directly generated, or playback lists can be created for multiple audio objects.

In step S6, an item of navigation information is prepared, which comprises the previously generated verbal designation. The preparation of the navigation information can take place similarly as in known methods, which use street names to mark waypoints. The navigation information therefore typically comprises, in addition to the verbal designation, an instruction to the user, for example, a driving instruction such as "turn right", and also under certain circumstances an item of information which specifies at which position the reference object is located with respect to the waypoint. The navigation information can also be formed in manifold ways. The navigation information can thus be calculated directly as audio information, to enable easy acoustic output, however, a preparation of the navigation information in text form is also possible, which is subsequently converted via a text-to-speech system or the like.

The acoustic output of the navigation information takes place in step S7. This can take place via a loudspeaker of the navigation system itself, however, it is also possible that the navigation system uses other loudspeakers. In particular, a loudspeaker of a motor vehicle can be used.

The method is then terminated with step S8. The method can be repeated for an arbitrary number of waypoints.

FIG. 2 and FIG. 3 show typical traffic situations, in which the method for operating the navigation system can be used. The traffic situations shown are identical except for the presence or absence of the truck 7. A motor vehicle 1 moves on a street 2. A navigation system is provided in the motor vehicle 1, which has previously calculated a route, which specifies turning of the motor vehicle 1 from the street 2 onto a street 3. The junction 25 therefore forms a waypoint of the route and the navigation information is to be output, with respect to the junction 25, that the motor vehicle is to turn right at the junction 25.

The navigation system therefore attempts to ascertain reference objects in the surroundings of the waypoint, i.e., the junction 25, to enable an output of the navigation information, which comprises a verbal designation of the reference object. By way of a database query, the motor vehicle 1 in the traffic situation shown in FIG. 2 can ascertain that a restaurant 5 is located at the junction 25. In addition, a tree 4 and a parked truck 6 are acquired by a vehicle camera of the motor vehicle 1. Therefore, three reference objects are ascertained.

However, only the designation of one of the reference objects is to be used for preparing the navigation information. Therefore, priorities are determined for the reference objects. By analyzing the camera data, the navigation system can ascertain that the restaurant 5 is nearly completely concealed by the tree 4 when viewed from the ego position of the motor vehicle and also remains concealed during further movement of the motor vehicle 1 toward the junction 25. A lower priority is therefore assigned to the restaurant 5. The tree 4 and the truck 6 are recognizable nearly equally well. However, since a movement of the tree 4 is much more improbable than a movement of the parked truck 6, a higher priority is determined for tree 4 in the traffic situation shown in FIG. 2. Therefore, tree 4 is determined as the reference object and "turn right after the tree", for example, can be output as the navigation information.

The traffic situation shown in FIG. 3 corresponds nearly completely to the traffic situation shown in FIG. 2, however, a further truck 7 is located in front of motor vehicle 1. During the determination of the priority information, it is furthermore established that the restaurant 5 is poorly recognizable from the ego position of the motor vehicle 1. A low priority is therefore still assigned to the restaurant 5. In contrast to the traffic situation in FIG. 2, however, the navigation system of the motor vehicle 1 can establish in the traffic situation in FIG. 3 that tree 4 is partially concealed by the truck 7 and therefore is much more poorly recognizable to the user of the navigation system than the truck 6. Therefore, the highest priority is assigned to the truck 6 and an item of navigation information can be output such as "turn right after the truck 6". To enable a clear differentiation from the truck 7, for example, the navigation information "turn right after the parked truck" can also be output or, if it was ascertained in the scope of the image recognition that the truck 6 is green, for example, "turn right after the green truck".

Figure 4:
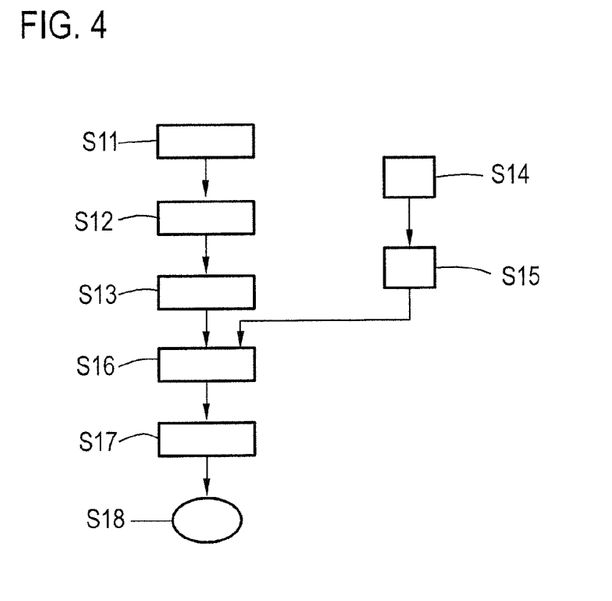
FIG. 4 shows a flow chart for determining a reference object as a part of an exemplary embodiment of a method according to the invention.

FIG. 4 shows a flow chart of the recognition and the selection of reference objects. Items of sensor information, an image of a camera here, are firstly acquired in step S11. The image data acquired in step S11 are analyzed in step S12 and one or more objects are recognized in the image data. Multiple objects, which are located in the surroundings of the waypoint, and which are presumed to be nonmoving, are selected in step S13 from the objects recognized in step S12.

An object can be assumed to be nonmoving, for example, if a fixed object, such as a house or the like, is recognized.

However, it can also be established by the analysis of further items of sensor information that the engine of an acquired motor vehicle is not running and therefore it is to be presumed that the motor vehicle is nonmoving, or the like. An acquisition of a stationary object over a longer period of time, without a recognizable cause for the object being stationary, for example, a traffic signal cycle or the like, being given, can also be evaluated as an indication that the object is a nonmoving object.

Simultaneously with the visual acquisition of objects, which can be selected as reference objects, in step S14 and step S15, further reference objects are determined by a database query. In step S14, the coordinates of the waypoint are firstly determined for this purpose. Such a coordinate has frequently already been determined during the route planning and is therefore present. A database having location-specific items of information is read out in step S15. This can be an Internet database, for example, in which items of position information for a variety of buildings or the like are present. Objects in the surroundings of the waypoint are read out from this database and determined as reference objects.

In step S16, a priority is established for each of the objects determined as reference objects in steps S13 and S15, using which it is determined which of these reference objects is to be used for preparing the navigation information. Items of priority information can be ascertained in particular from an actual or expected visibility of the object, the clarity of the object, the probability that the object is fixed in place, or the like. In step S17, the reference object having the highest priority information is selected. The reference object is therefore selected with step S18 and the method can be continued with the assignment of a verbal designation to the reference object, i.e., for example, with step S5 from FIG. 1.

Figure 5:
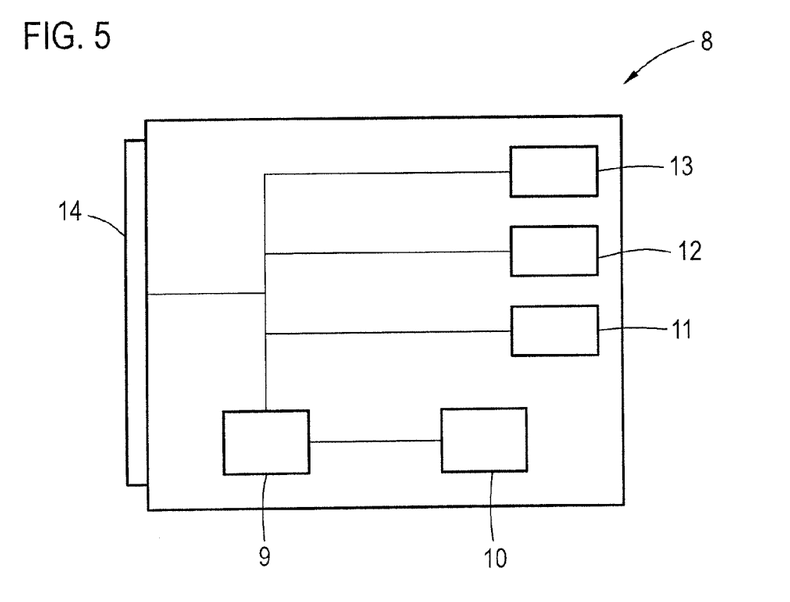
FIG. 5 shows a schematic illustration of an exemplary embodiment of a navigation system according to the invention.

FIG. 5 schematically shows an exemplary embodiment of a navigation system, which is designed for carrying out several of the described methods. The navigation system 8 comprises a computer system 9 having an assigned memory 10. The computer system 9 additionally reads the items of information of a position sensor 11, which is designed as a GPS sensor, can activate a communication system 12, which establishes a wireless connection to the Internet here, and can output items of audio information via a loudspeaker 13. In addition, an operating system 14, which both enables image display and also user inputs, is activated and read out via the computer system 9. Depending on the user inputs at the operating interface 14, a route can be planned in the computer system 9 by using a digital map stored in the assigned memory 10. For an upcoming waypoint of this route, a reference object can be determined with the aid of the digital map and additional database queries via the communication system 12. Subsequently, the computer system can calculate a digital representation of a waveform, which represents the navigation information, wherein the navigation information comprises a verbal designation for the determined reference object. This waveform can then be output to the loudspeaker 13 via a digital-analog converter (not shown).

Figure 6:
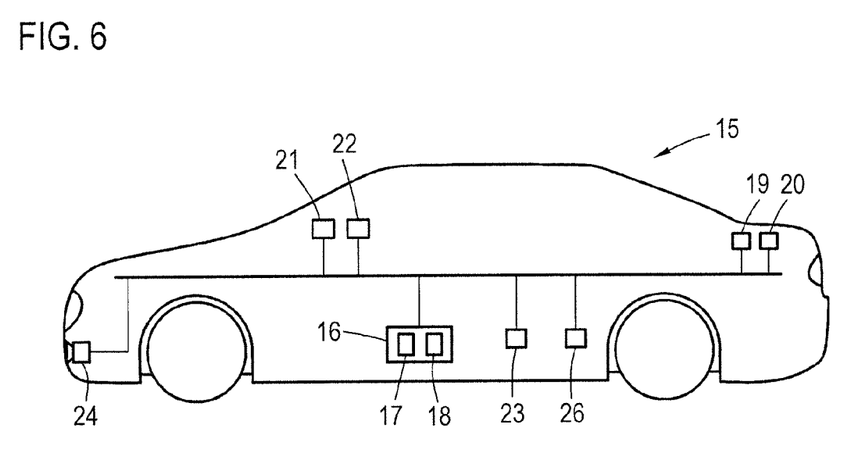
FIG. 6 shows a schematic illustration of an exemplary embodiment of a motor vehicle according to the invention.

FIG. 6 shows an exemplary embodiment of a motor vehicle, which comprises a navigation system 16, which can carry out the described method. The navigation system 16 comprises a computer system 17, and an associated memory 18, which comprises a digital map. Components of the motor vehicle are also used for the further functions of the navigation system 16. Thus, a communication takes place via a communication system of the motor vehicle 20, the position determination takes place via a position determination system 19 of the motor vehicle, and user guiding takes place via a user interface 22, which comprises both a graphic display capability and also input means. For example, a combination of a display screen and a push/turn control knob can be used as the operating element 22. Items of navigation information can be output via the loudspeaker 21, which is part of the audio system of the motor vehicle.

The individual components of the motor vehicle 15 communicate via a CAN bus. In addition to the mentioned components, the navigation system 16 can also access items of image information of a camera 24 on the front side of the motor vehicle, an additional data memory 23, and items of object information from a driver assistance system 26. In relation to the navigation system shown in FIG. 5, it is therefore additionally possible for the navigation system 16 in the motor vehicle 15 to determine reference objects by analyzing images of the camera 24. Moreover, databases present in the data memory 23 can additionally be used. The driver assistance system 26 can also provide auxiliary items of information, for example, about further motor vehicles. In particular, it is known that driver assistance systems can also acquire and identify parked motor vehicles.

It is additionally advantageous in the motor vehicle 15 that items of information about the field of vision from the ego position of the motor vehicle can be ascertained by the camera 24. As already explained with reference to FIG. 2 and FIG. 3, such items of information can be used in particular for selecting a single reference object from a variety of reference objects.

The invention claimed is:

1. A method for operating a navigation system, in particular in a motor vehicle, comprising the following steps:
    determining an upcoming waypoint of a route, which is planned by the navigation system, with respect to which an item of navigation information is to be output to a user,
    ascertaining surroundings data, which relate to the surroundings of the waypoint, at least partially on the basis of image data of a camera, which is arranged on the motor vehicle and acquires the surroundings, by way of the navigation system,
    ascertaining at least one reference object, which is located in the surroundings of the waypoint, by image recognition in the image data from the surroundings data, wherein a parked vehicle, which is not moving, is ascertained as the reference object, wherein it is ascertained whether a movement of the parked vehicle can be expected, by ascertaining via sensors whether the engine of the parked vehicle is running and/or whether the parked vehicle is located in a parking space or on a street and/or whether a lack of movement of the parked vehicle is observed for a provided minimum time,
    assigning a verbal designation to the reference object,
    preparing the navigation information comprising the designation, and
    acoustically outputting the navigation information.

2. The method according to claim 1,
    characterized in that the navigation system determines the surroundings data at least partially by determining a position of the waypoint and analyzing at least one database with location-specific items of information.

3. The method according to claim 2,
    characterized in that the database is external, and the access to the external database takes place by way of wireless communication.

4. The method according to claim 1,
characterized in that if multiple reference objects are ascertained, an item of priority information is ascertained for the reference objects and a reference object, the designation of which is output, is selected in dependence on the priority information.

5. A navigation system for guiding a user along a route determined by the navigation system,
characterized in that it uses the method according to claim 1.

6. A motor vehicle,
characterized in that it comprises a navigation system according to claim 5.

* * * * *